United States Patent
Chae et al.

(10) Patent No.: US 8,114,548 B2
(45) Date of Patent: Feb. 14, 2012

(54) FUEL CELL WITH AUXILLIARY ELECTRIC POWER SUPPLY

(75) Inventors: Kyoung-Soo Chae, Suwon-si (KR); Jae-Hyuk Jang, Seoul (KR); Hye-Yeon Cha, Yongin-si (KR); Bo-Sung Ku, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 351 days.

(21) Appl. No.: 12/471,678

(22) Filed: May 26, 2009

(65) Prior Publication Data
US 2010/0092828 A1    Apr. 15, 2010

(30) Foreign Application Priority Data
Oct. 15, 2008  (KR) ........................ 10-2008-0101077

(51) Int. Cl.
*H01M 8/04* (2006.01)

(52) U.S. Cl. ...................................... 429/445; 429/517

(58) Field of Classification Search .......... 429/445–457, 429/468, 483, 512–514, 517–522
See application file for complete search history.

(56) References Cited

U.S. PATENT DOCUMENTS

| | | | | |
|---|---|---|---|---|
| 6,080,503 | A * | 6/2000 | Schmid et al. | 429/483 |
| 6,733,916 | B2 * | 5/2004 | Mizuno | 429/456 |
| 7,341,800 | B2 * | 3/2008 | Sasahara et al. | 429/513 |
| 7,390,528 | B2 * | 6/2008 | Morii | 427/115 |
| 7,579,101 | B2 * | 8/2009 | Choi | 429/435 |
| 7,651,805 | B2 * | 1/2010 | Inoue et al. | 429/480 |
| 7,754,371 | B2 * | 7/2010 | Suzuki et al. | 429/49 |
| 7,842,433 | B2 * | 11/2010 | Nakanishi et al. | 429/518 |

FOREIGN PATENT DOCUMENTS

KR   10-2007-0109477   11/2007

OTHER PUBLICATIONS

Korean Office Action, with Partial English Translation, issued in Korean Patent Application No. 10-2008-0101077, dated Dec. 28, 2010.

* cited by examiner

*Primary Examiner* — Thanh Tam Le
(74) *Attorney, Agent, or Firm* — McDermott Will & Emery LLP

(57) ABSTRACT

A fuel cell is disclosed. The fuel cell in accordance with an embodiment of the present invention includes: a membrane-electrode assembly, which has an electrolyte membrane, an anode being formed on one surface of the electrolyte membrane and a cathode being formed on the other surface of the electrolyte membrane; and an auxiliary electric power supply having a flow path formed on the surface thereof and being laminated on the membrane-electrode assembly such that the flow path faces the membrane-electrode assembly.

3 Claims, 2 Drawing Sheets

FUEL CELL WITH AUXILLIARY ELECTRIC POWER SUPPLY

CROSS-REFERENCE TO RELATED APPLICATIONS

This application claims the benefit of Korean Patent Application No. 10-2008-0101077, filed with the Korean Intellectual Property Office on Oct. 15, 2008, the disclosure of which is incorporated herein by reference in its entirety.

BACKGROUND

1. Technical Field

The present invention relates to a fuel cell.

2. Description of the Related Art

Recently, as portable electronic devices become smaller and have more functions, it is required that the electric power supply for supplying electrical energy to the electronic devices has a higher efficiency and lasts longer. To this end, fuel cells, which directly convert chemical energy to electrical energy, have become more significant as alternative means that can dramatically increase the efficiency and life span of the conventional portable electric power supply.

Fuel cells according to the conventional technology generate electrical energy through an oxidation-reduction reaction of a membrane-electrode assembly comprised of an anode, a cathode and an electrolyte membrane.

However, according to the conventional technology, the electrical energy generation by the membrane-electrode assembly is inconsistent. If a separate auxiliary device is added to prevent the inconsistency problem, the fuel cell becomes inadvertently larger.

SUMMARY

The present invention provides a fuel cell that complements a sudden change of electrical energy generated by a membrane-electrode assembly and has a reduced size.

An aspect of the present invention features a fuel cell. The fuel cell in accordance with an embodiment of the present invention includes: a membrane-electrode assembly having an electrolyte membrane, an anode being formed on one surface of the electrolyte membrane and a cathode being formed on the other surface of the electrolyte membrane; and an auxiliary electric power supply having a flow path formed on the surface thereof and being laminated on the membrane-electrode assembly such that the flow path faces the membrane-electrode assembly.

Here, the auxiliary electric power supply can be a lithium polymer battery.

The auxiliary electric power supply can be laminated on the anode such that the flow path faces the anode.

The fuel cell can further include an end plate being laminated on the cathode and having an opening formed therein such that the outside air is provided to the cathode.

DETAILED DESCRIPTION

Figure 1:
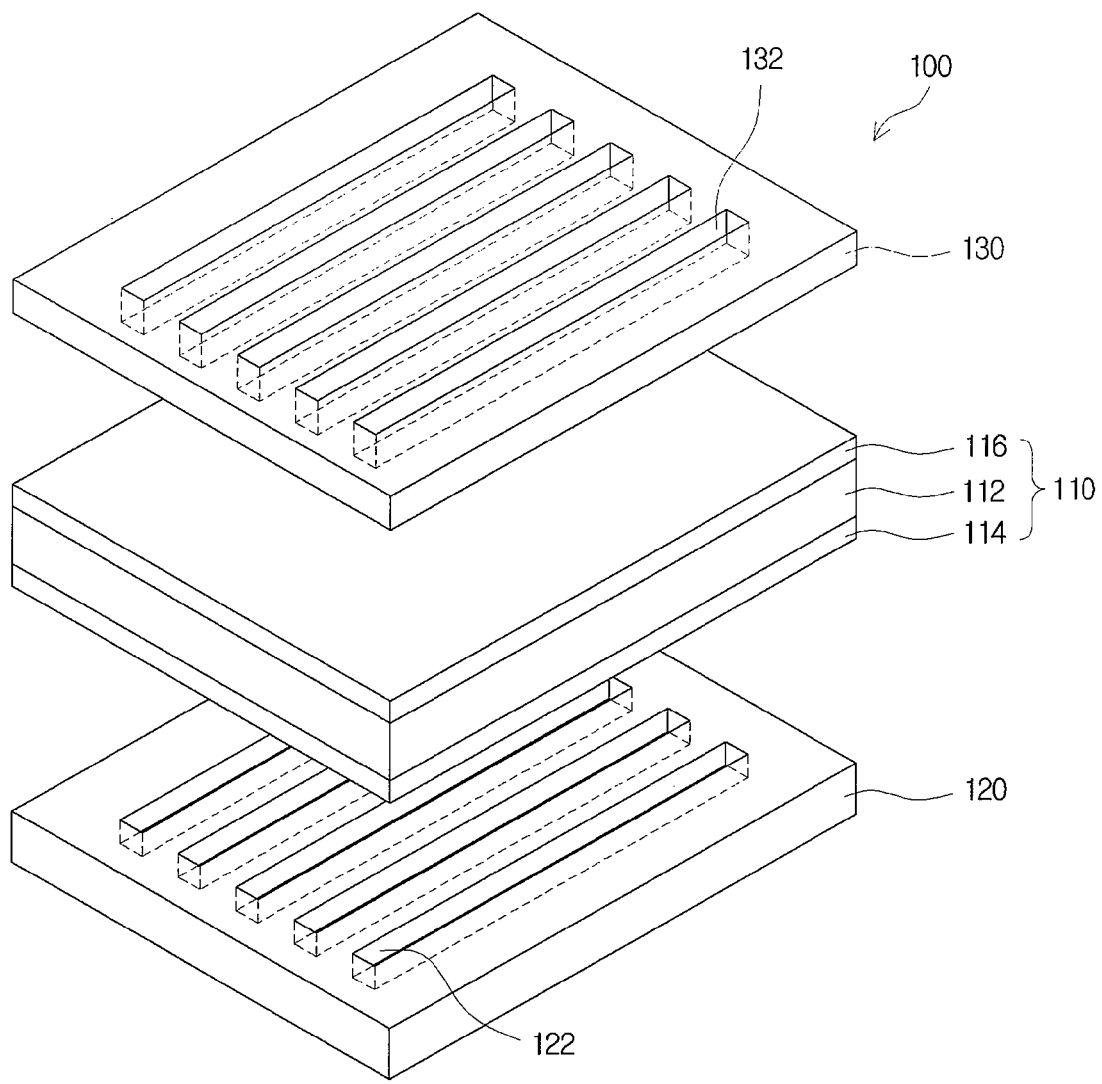
FIG. 1 is an exploded perspective view showing a fuel cell according to an embodiment of the present invention.

An embodiment of a fuel cell in accordance with the present invention will be described in detail with reference to the accompanying drawings. In the description with reference to the accompanying drawings, the same reference numerals will be assigned to the same or corresponding elements, and repetitive descriptions thereof will be omitted.

Furthermore, what is referred to laminate, be laminated, stack or be stacked shall mean not only that one element is in direct physical contact with another element but also that an element is interposed between two elements such that the two elements are in contact with the element.

Figure 2:
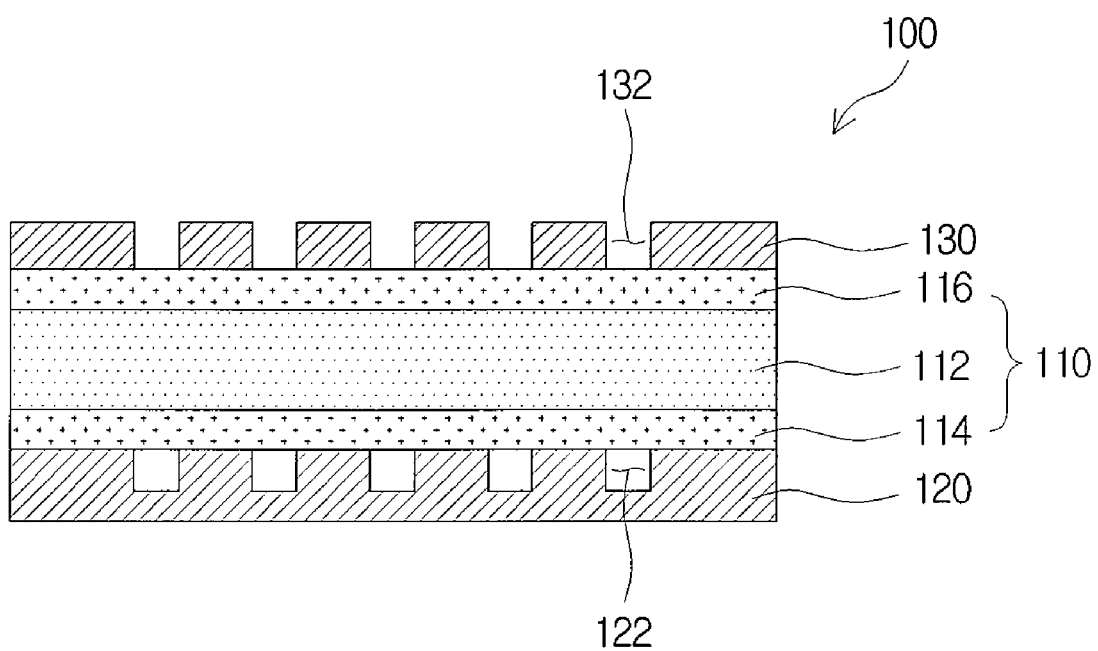
FIG. 2 is a cross sectional view showing a fuel cell according to an embodiment of the present invention.

FIG. 1 is an exploded perspective view showing a fuel cell 100 according to an embodiment of the present invention. FIG. 2 is a cross sectional view showing a fuel cell 100 according to an embodiment of the present invention.

As shown in FIGS. 1 and 2, an embodiment of the present invention provides a fuel cell 100 including a membrane-electrode assembly 110, which has an electrolyte membrane 112, an anode 114 being formed on one surface of the electrolyte membrane 112 and a cathode 116 being formed on the other surface of the electrolyte membrane 112, and an auxiliary electric power supply 120 having a flow path 122, which is formed on the surface and laminated on the membrane-electrode assembly 110 such that the flow path 122 faces the membrane-electrode assembly 110.

According to this embodiment of the present invention, a sudden change of electrical energy generated by the membrane electrolyte assembly 110 can be complemented by using the auxiliary electric power supply 120. The size of the fuel cell 100 can be reduced by substituting all or part of a pair of end plates with the auxiliary electric power supply 120.

Hereinafter, each element will be described in more detail with reference to FIGS. 1 and 2.

The membrane electrolyte assembly 110, as shown in FIGS. 1 and 2, includes the electrolyte membrane 112, the anode 114 being formed on one surface of the electrolyte membrane 112 and the cathode 116 being formed on the other surface of the electrolyte membrane 112. That is, the membrane electrolyte assembly 110 is comprised of the anode 114, the cathode 116 and the electrolyte membrane 112, which is interposed between the anode 114 and the cathode 116, to generate electrical energy by converting chemical energy.

Here, the electrolyte membrane 112 is interposed between the anode 114 and the cathode 116, transferring hydrogen ions, generated by an oxidation reaction of the anode 114, to the cathode 116. The electrolyte membrane 112 can be made of high polymer.

The anode 114 is formed on one surface of the electrolyte membrane 112. The anode 114 is supplied with fuel, such as hydrogen or methanol, and generates hydrogen ions and electrons through an oxidation reaction at a catalyst layer of the anode 114. The cathode 116 is formed on the other surface of the electrolyte membrane 112. The cathode 116 is supplied with the hydrogen ions and electrons, which are generated by the anode 114, and oxygen and generates water through a reduction reaction at the catalyst layer of the cathode 116.

The anode 114 and the cathode 116 have a chemical reaction of the following reaction scheme (1) or (2), depending on the kind of fuel, to generate electrical energy. Here, hydrogen is supplied to the anode 114 in reaction scheme (1), and methanol is supplied to the anode 114 in reaction scheme (2).

Anode 114: $H_2 \rightarrow 2H^+ + 2e^-$

Cathode 116: $O_2 + 4H^+ + 4e^- \rightarrow 2H_2O$

Overall Reaction: $2H_2 + O_2 \rightarrow 2H_2O$     [Reaction Scheme 1]

Anode 114: $CH_3OH + H_2O \rightarrow CO_2 + 6H^+ + 6e^-$

Cathode 116: $1.5O_2 + 6H^+ + 6e^- \rightarrow 3H_2O$

Overall Reaction: $CH_3OH + 1.5O_2 \rightarrow CO_2 + 2H_2O$ [Reaction Scheme 2]

Meanwhile, the auxiliary electric power supply 120 has the flow path 122 formed on the surface and is laminated on the membrane electrolyte assembly 110 such that the flow path 122 faces the membrane electrolyte assembly 110. As such, a fuel cell 100 of hybrid type can be implemented by using the auxiliary electric power supply 120, complementing the sudden change in electrical energy generated by the membrane electrolyte assembly 110.

As shown in FIGS. 1 and 2, the flow path 122, to which fuel is supplied, is formed on an external case of the auxiliary electric power supply 120. The auxiliary electric power supply 120 is laminated on the anode 114 such that the flow path 122 faces the membrane-electrode assembly 110.

Generally, a pair of end plates are laminated on both surfaces of the membrane-electrode assembly 110. In this embodiment of the present invention, the end plate on the side of the anode 114 is substituted by the auxiliary electric power supply 120 to reduce the overall size of the fuel cell 100.

While the present embodiment presents an example of substituting the end plate on the side of the anode 114 with the auxiliary electric power supply 120, it is also possible, within the scope of the claims of the present invention, that the end plate on the side of the cathode 116 is substituted by the auxiliary electric power supply 120 or both end plates on the sides of the anode 114 and the cathode 116 are substituted by the auxiliary electric power supply 120.

Here, a lithium polymer battery can be used as the auxiliary electric power supply 120. Since the lithium polymer battery can be manufactured in various sizes and shapes and manufactured to have a thickness of 2 mm or less, the shape of the fuel cell 100 can be liberally designed and the size of the fuel cell 100 can be reduced.

Meanwhile, as shown in FIGS. 1 and 2, an end plate 130 is laminated on the cathode 116. An opening 132 is formed in the end plate 130 such that the outside air is supplied to the cathode 116. In other words, the opening 132 is formed in the end plate 130 laminated on the cathode 116 such that the cathode 116 can be supplied with the outside air.

As such, because the end plate 130 in which the opening 132 is formed is laminated on the cathode 116 of the membrane electrolyte assembly 110, the cathode is supplied with oxygen from the outside air by natural convection without a separate, additional device to operate the fuel cell 100. Accordingly, the overall size of the fuel cell 100 can be reduced.

While an embodiment of the present invention has been described, it is possible for those skilled in the art to make various changes and modifications of the forms and details of the present invention by means of addition, change, elimination or supplement of the elements of the present invention without departing from the spirit of the present invention as defined by the appended claims, which also belongs to the scope of claims of the present invention.

What is claimed is:

1. A fuel cell comprising:
   a membrane-electrode assembly having an electrolyte membrane, an anode being formed on one surface of the electrolyte membrane and a cathode being formed on the other surface of the electrolyte membrane; and
   an auxiliary electric power supply having a flow path formed on the surface thereof and being laminated on the membrane-electrode assembly such that the flow path faces the membrane-electrode assembly.

2. The fuel cell of claim 1, wherein the auxiliary electric power supply is a lithium polymer battery.

3. The fuel cell of claim 1, further comprising an end plate being laminated on the cathode and having an opening formed therein such that the outside air is provided to the cathode, wherein the auxiliary electric power supply is laminated on the anode such that the flow path faces the anode.

* * * * *